United States Patent

Kashiba et al.

[11] Patent Number: 5,849,380
[45] Date of Patent: Dec. 15, 1998

[54] DEOXIDIZING MULTI-LAYER MATERIAL AND PACKAGING CONTAINER USING SAME

[75] Inventors: Takashi Kashiba, Tokyo; Ryoji Otaki, Hiratsuka; Yoshiki Ito, Tokyo, all of Japan

[73] Assignee: Mitsubishi Gas Chemical Company, Inc., Tokyo, Japan

[21] Appl. No.: 762,101

[22] Filed: Dec. 9, 1996

[30] Foreign Application Priority Data

Dec. 27, 1995 [JP] Japan .................................. 7-340671
Jul. 22, 1996 [JP] Japan .................................. 8-192309

[51] Int. Cl.$^6$ .................................. D32B 27/18
[52] U.S. Cl. .................. 428/36.6; 428/474.4; 428/475.8
[58] Field of Search .................. 428/36.6, 474.4, 428/475.8

[56] References Cited

U.S. PATENT DOCUMENTS

| | | | |
|---|---|---|---|
| 5,077,109 | 12/1991 | Lustig et al. | 428/36.91 |
| 5,116,660 | 5/1992 | Komatsu et al. | 428/192 |
| 5,175,238 | 12/1992 | Matlack et al. | 528/339 |
| 5,418,068 | 5/1995 | Caluori et al. | 428/474.4 |
| 5,562,996 | 10/1996 | Kuriu et al. | 428/474.4 |

FOREIGN PATENT DOCUMENTS

| | | |
|---|---|---|
| 0 367 390 | 5/1990 | European Pat. Off. . |
| 0 409 666 | 1/1991 | European Pat. Off. . |
| 0 688 666 | 12/1995 | European Pat. Off. . |

OTHER PUBLICATIONS

Database WPI, Section Ch, Week 9219, Derwent Publications Ltd. London, GB; Class A92 of JP-A-04 090 848 (TOA Gosei Chem. Ind.), 24 Mar. 1992.

*Primary Examiner*—Charles Nold
*Attorney, Agent, or Firm*—Frishauf, Holtz, Goodman, Langer & Chick, P.C.

[57] ABSTRACT

A sheet-like or a film-like deoxidizing multi-layer material is herein disclosed which comprises an oxygen absorbing layer as a middle layer comprising an oxygen absorbing resin composition in which a deoxidizer composition is blended, a gas barrier layer as an outer layer comprising a gas barrier resin, and an oxygen permeating layer as an inner layer comprising an oxygen permeating resin, the gas barrier resin comprising a polyamide or a polyamide copolymer which contains 90 mol % or more of an amide structure unit produced by the polycondensation reaction of metaxylylenediamine with adipic acid.

20 Claims, 1 Drawing Sheet

DEOXIDIZING MULTI-LAYER MATERIAL AND PACKAGING CONTAINER USING SAME

BACKGROUND OF THE INVENTION (i) Field of the Invention The present invention relates to a sheet-like or a film-like deoxidizing multi-layer material which does not deteriorate oxygen barrier properties even when exposed to high-temperature and high-humidity conditions and which is excellent in moldability and workability, and it also relates to packaging containers (the concept of the packaging containers referred to in the present invention include lids for the containers, top seal lids, attachments for the containers in addition of the containers which are filled with materials to be packed) prepared by molding or using this multi-layer material.

More specifically, the present invention relates to a sheet-like or a film-like deoxidizing multi-layer material which comprises an oxygen absorbing layer as a middle layer comprising an oxygen absorbing resin composition in which a deoxidizer composition is blended, a gas barrier layer as an outer layer comprising a gas barrier resin, and an oxygen permeating layer as an inner layer comprising an oxygen permeating resin, a polyamide or a polyamide copolymer containing 90 mol % or more of an amide structure unit produced by the polycondensation reaction of metaxylylenediamine with adipic acid being used as the gas barrier layer of the outer layer, and it also relates to a packaging container having a deoxidizing performance.

(ii) Description of the Related Art

In recent years, by one of deoxidizing package techniques, there have been developed packaging containers comprising a multi-layer material having a deoxidizing resin layer in which a deoxidizer composition is blended, and these containers intend to improve barrier properties and to impart a deoxidizing function to themselves. In general, the packaging containers having the deoxidizing function are made of a deoxidizing multi-layer material which comprises a deoxidizing resin layer as a middle layer in which a deoxidizer composition is blended, a gas barrier outer layer formed outside the middle layer, and an oxygen permeating inner layer formed inside the middle layer, and the sheet-like and film-like deoxidizing multi-layer materials have been developed as multi-layer resin layer laminate structures which can easily be molded and worked into containers such as bags, cups, trays and bottles.

As the deoxidizing multi-layer materials, there can be utilized multi-layer films and sheets containing a layer formed by dispersing a deoxidizing composition in a resin, which are disclosed in, for example, Japanese Patent Application Laid-open Nos. 146651/1982, 72851/1990 and 90848/1992. Furthermore, Japanese Patent Publication No. 60826/1992 has disclosed a technique in which a deoxidizer is blended in a gas barrier thermoplastic resin layer of a multi-layer material, and the deoxidizer in the gas barrier resin is brought into contact with water and then activated at the time of a heating sterilization treatment to exert a deoxidizing power, with the result that the gas barrier properties of a deoxidizing multi-layer container can be heightened. Moreover, in Japanese Patent Application Laid-open No. 309323/1995, a molded deoxidizing multi-layer container has been disclosed in which there can be eliminated the thickness unevenness of an inner layer caused by an ethylene-vinyl alcohol copolymer layer at the time of the molding of the container from a propylene resin and an ethylene-vinyl alcohol copolymer having a specific melting point or softening point. Furthermore, Japanese Patent Application Laid-open No. 729421/1996 has disclosed a technique for improving the deoxidizing performance of a deoxidizing multi-layer container.

For the outer gas barrier resin layer of the deoxidizing multi-layer container, an ethylene-vinyl alcohol copolymer (hereinafter abbreviated to "EVOH") which is excellent in oxygen barrier properties has usually been used. However, in the case that the deoxidizing multi-layer containers are used as, for example, packages for food wrapping, they are often exposed to high-temperature and high-humidity conditions in a steam heating sterilization treatment after the filling and sealing of the foods or in a, retort treatment after the filling and sealing of the foods containing much water. However, if the EVOH is exposed to the high-temperature and high-humidity conditions, its oxygen barrier properties noticeably deteriorate. Accordingly, once the deoxidizing multi-layer containers having the gas barrier layer of the EVOH are subjected to a high-humidity heating treatment, the oxygen barrier properties of the containers deteriorate, so that there occurs a problem that the invasion of oxygen through the walls of the containers cannot sufficiently be prevented. In order to solve this problem, various attempts have been made, but many unsettled problems of molding and working techniques as well as costs are still present.

SUMMARY OF THE INVENTION

Under such circumstances, the present invention has been developed to solve the above-mentioned problems of conventional deoxidizing multi-layer materials, and an object of the present invention is to provide a sheet-like or a film-like deoxidizing multi-layer material which does not deteriorate oxygen barrier properties even when exposed to high-temperature and high-humidity conditions and which has highly heat-resistant gas barrier properties and which is excellent in moldability and workability.

Another object of the present invention is to provide a packaging container obtained by molding this deoxidizing multi-layer material.

The present inventors have intensively researched with the intention of solving the above-mentioned problems, and as a result, it has been that these problems can easily be solved by the use of a sheet-like or a film-like deoxidizing multi-layer material which comprises an oxygen absorbing layer as a middle layer comprising an oxygen absorbing resin composition in which a deoxidizer composition is blended, a gas barrier layer as an outer layer comprising a gas barrier resin, and an oxygen permeating layer as an inner layer comprising an oxygen permeating resin, the gas barrier resin comprising a polyamide or a polyamide copolymer (hereinafter referred to as "polymetaxylyleneadipamide" sometimes) which contains 90 mol % or more of an amide structure unit produced by the polycondensation reaction of metaxylylenediamine with adipic acid. It has also been found that more preferably, when an amorphous polyamide is blended with the polymetaxylyleneadipamide of the gas barrier resin, the sheet-like or the film-like deoxidizing multi-layer material having an excellent moldability and workability can be obtained.

That is to say, the present invention is directed to a sheet-like or a film-like deoxidizing multi-layer material which comprises an oxygen absorbing layer as a middle layer comprising an oxygen absorbing resin composition in which a deoxidizer composition is blended, a gas barrier layer as an outer layer comprising a gas barrier resin, and an oxygen permeating layer as an inner layer comprising an oxygen permeating resin, the gas barrier resin comprising a polyamide or a polyamide copolymer which contains 90 mol % or more of an amide structure unit produced by the polycondensation reaction of metaxylylenediamine with adipic acid.

The deoxidizing multi-layer material of the present invention is also characterized in that the gas barrier resin is a mixed resin obtained by adding an amorphous polyamide to the polymetaxylyleneadipamide or the like.

The deoxidizing multi-layer material of the present invention is further characterized in that a mixing ratio (% by weight) of the polymetaxylyleneadipamide to the amorphous polyamide is in the range of 80:20 to 30:70.

The deoxidizing multi-layer material of the present invention is further characterized in that the amorphous polyamide which is used in the case that the gas barrier resin is the mixed resin is at least one selected from the group consisting of a polycondensate of terephthalic acid and trimethylhexamethylenediamine, a copolycondensate of 2,2-bis(p-aminocyclohexyl)propane, adipic acid and azelaic acid, a copolycondensate of bis(3-methyl-4-aminocyclohexyl)methane, isophthalic acid and ω-aminododecanoic acid, a copolycondensate of diphenylmethane diisocyanate and a mixture of adipic acid, azelaic acid and isophthalic acid, and a copolycondensate of terephthalic acid, isophthalic acid and hexamethylenediamine.

The deoxidizing multi-layer material of the present invention is further characterized in that the melt flow rate of the amorphous polyamide which is used in the case that the gas barrier resin is the mixed resin is 8 g/10 min or less as measured under conditions of a temperature of 230° C. and a load of 2.16 kgf in accordance with ASTM D1238.

The deoxidizing multi-layer material of the present invention is further characterized in that the glass transition point of the amorphous polyamide which is used in the case that the gas barrier resin is the mixed resin is in the range of 80° to 150° C.

The deoxidizing multi-layer material of the present invention is further characterized in that a protective layer comprising a gas barrier properties protecting resin is formed on the outer surface of the gas barrier layer.

A packaging container of the present invention is characterized in that the deoxidizing multi-layer material of the present invention in which the gas barrier resin is the polymetaxylyleneadipamide or the like is molded as at least a part of the wall of the container and is used so that the inner layer of the multi-layer material is faced inside the container.

The packaging container of the present invention is further characterized in that the deoxidizing multi-layer material of the present invention in which the gas barrier resin is a blend obtained by blending the amorphous polyamide with the polymetaxylyleneadipamide or the like is molded as at least a part of the wall of the container and is used so that the inner layer of the multi-layer material is faced inside the container.

In the deoxidizing multi-layer material of the present invention, a polyamide or a polyamide copolymer containing 90 mol % or more of an amide structure unit produced by the polycondensation reaction of metaxylylenediamine with adipic acid is used for the gas barrier resin as the outer layer, whereby the deoxidizing multi-layer material does not deteriorate oxygen barrier properties even when particularly exposed to high-temperature and high-humidity conditions, which means that the multi-layer material has highly heat-resistant gas barrier properties.

Furthermore, when an amorphous polyamide is blended with the polymetaxylyleneadipamide or the like of the gas barrier resin, the deoxidizing multi-layer material can be obtained which is excellent in sheet moldability and which permits the molding and working of containers in a sufficiently wide allowable molding temperature range and in a relatively low temperature range.

In the packaging container of the present invention, the above-mentioned deoxidizing multi-layer material is used, and the inner layer of this multi-layer material is faced inside the container. In consequence, the thus constituted container is a high-performance container which can prevent the invasion of oxygen from the outside of the container and can remove oxygen from the container.

DETAILED DESCRIPTION OF THE INVENTION

A deoxidizing multi-layer material (hereinafter abbreviated simply to "the multi-layer material" sometimes) and multi-layer containers of the present invention are a sheet-like or a film-like deoxidizing multi-layer material which comprises an oxygen absorbing layer as a middle layer comprising an oxygen absorbing resin composition obtained by blending a deoxidizer composition with a thermoplastic resin, a gas barrier layer as an outer layer comprising a gas barrier resin of a polyamide or a polyamide copolymer which contains 90 mol % or more of an amide structure unit produced by the polycondensation reaction of metaxylylenediamine with adipic acid, and an oxygen permeating layer as an inner layer comprising an oxygen permeating resin; and multi-layer packaging containers such as bags, cups, trays and bottles in which the inner layer is faced inside each container or is molded as a part of the packaging container, respectively. They can function as the multi-layer material and the containers having a deoxidizing performance, respectively.

Figure 1:
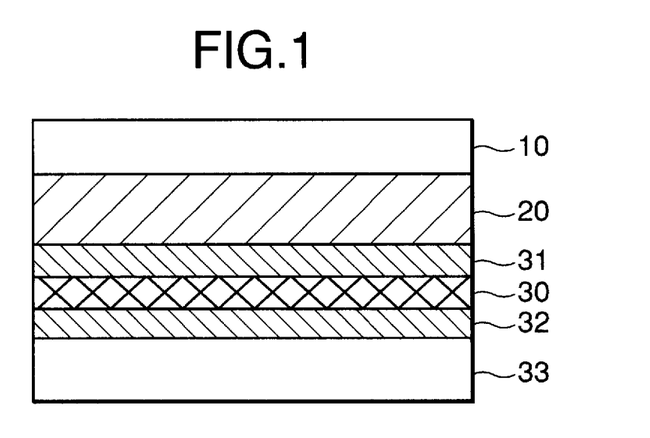
FIG. 1 is a sectional view of a deoxidizing multi-layer material of the present invention.

For example, as shown in FIG. 1, a typical embodiment of the deoxidizing multi-layer material according to the present invention has a layer structure comprising an inner layer 10 (an oxygen permeating layer), a middle layer 20 (an oxygen absorbing layer), an adhesive layer 31, an outer layer 30 (a gas barrier layer), an adhesive layer 32 and a protective layer 33. This multi-layer material is not always constituted of the inner layer, the middle layer and the outer layer alone which are the main layers, and if necessary, another layer can be attached to any of the respective layers. In this embodiment, one or plural other layers are attached to both the sides of the outer layer 30 (the gas barrier layer).

Reference will be made to the functions of the respective layers of the outer layer, the middle layer and the inner layer which are the main layers of the packaging container of the present invention obtained by using and molding the above-mentioned multi-layer material. The outer layer 30 is the gas barrier layer, which can play the role of hindering the invasion of oxygen from the outside. The middle layer 20 is the oxygen absorbing layer, and this layer can play the role of absorbing not only invaded oxygen which cannot be completely blocked by the outer layer but also oxygen in the container through the inner layer. The inner layer 10 is the oxygen permeating layer, which can play a role as an isolating layer for preventing the oxygen absorbing layer of the middle layer from directly coming in contact with a matter received in the container as well as a role of allowing oxygen in the container to effectively and promptly permeate through the inner layer itself so that the oxygen absorbing layer may sufficiently exert its oxygen absorbing function.

Next, the deoxidizing multi-layer material of the present invention will be described with reference to FIG. 1.

As a gas barrier resin for the outer layer, there can be used a polyamide or a polyamide copolymer containing 90 mol % or more of an amide structure unit produced by the polycondensation reaction of metaxylylenediamine with adipic acid.

The above-mentioned polyamide is a polycondensate of metaxylylenediamine and adipic acid, and it also called Nylon MXD6. Incidentally, in the present invention, metaxylylenediamine and adipic acid are mentioned as the raw materials of the polycondensation reaction for forming the amide structure unit, i.e., —CONH—, but these raw materials are merely typical examples for forming —CONH—. Therefore, any precursors are acceptable as the raw materials, so long as they can form —CONH—. Therefore, the concept of metaxylylenediamine in the present invention include, for example, hydrochlorides and various derivatives thereof, and the concept of adipic acid include various derivatives such as acid halides and esters thereof. These kinds of raw materials do not have an influence on the technical range of the present invention.

Furthermore, the above-mentioned polyamide copolymer means a polyamide as a copolymer containing, as comonomers, a diamine and a dicarboxylic acid (which are not limited to a free diamine and a free dicarboxylic acid, and this is the same as in the case of metaxylylenediamine and adipic acid as the raw materials for the polyamide regarding the present invention) other than metaxylylenediamine and adipic acid which are the raw materials for the polyamide, and further containing an amino acid (which includes a lactam) having both an amino group and a carboxyl group.

In the polyamide copolymer regarding the present invention, if an amide structure unit based on the diamine and the dicarboxylic acid other than metaxylylenediamine and adipic acid is excessively used, the desired object cannot be achieved, and it is necessary that the structure unit produced by the polycondensation reaction of metaxylylenediamine with adipic acid should be 90 mol % or more.

In this connection, the above-mentioned gas barrier resin may contain a crystalline polyamide other than the above-mentioned polyamide or polyamide copolymer, so long as it does not impair the object of the present invention, but the content of the crystalline polyamide is preferably 30% by weight or less.

Moreover, in order to improve the moldability and workability of the deoxidizing multi-layer material, the gas barrier resin is preferably a mixed resin of the above-mentioned polyamide or polyamide copolymer and an amorphous polyamide. Here, the amorphous polyamide means an amide called an amorphous nylon or a transparent nylon, and it is especially a nylon which is different from straight-chain aliphatic nylons such as 6-nylon and 6,6-nylon and in which the crystallization of the polymer scarcely occurs or a crystallization rate is very low. Examples of the preferably usable amorphous polyamide include a polycondensate of terephthalic acid and trimethylhexamethylenediamine, a copolycondensate of 2,2-bis(p-aminocyclohexyl)propane, adipic acid and azelaic acid, a copolycondensate of bis(3-methyl-4-aminocyclohexyl)methane, isophthalic acid and ω-aminododecanoic acid, a copolycondensate of diphenylmethane diisocyanate and a mixture of adipic acid, azelaic acid and isophthalic acid, and a copolycondensate of terephthalic acid, isophthalic acid and hexamethylenediamine.

The amorphous polyamide which can be used in the present invention is a polyamide in which its melt flow rate (MFR) is preferably 8 g/10 min or less, more preferably 6 g/10 min or less as measured under conditions of a temperature of 230° C. and a load of 2.16 kgf in accordance with ASTM D1238. If the amorphous polyamide having an MFR of more than 8 g/10 min is used, the viscosity of the gas barrier resin excessively lowers at the time of molding the sheets of the deoxidizing multi-layer material, so that the multi-layer sheets having a stable thickness cannot be obtained any more.

Furthermore, the amorphous polyamide which can be used in order to improve the hot moldability and workability of the deoxidizing multi-layer material preferably has a glass transition point of 80° to 150° C. When the amorphous polyamide having a glass transition point in the above-mentioned range is added to the above-mentioned polyamide or polyamide copolymer, the occurrence of stretching unevenness and thickness unevenness due to the crystallization of the resin can be prevented during the molding into the containers of the multi-layer material, whereby the good containers can be molded under wide heating molding conditions. For example, even in the case that the surface temperature of the sheets during the hot molding is high or low, or even in the case that a heating time is long or short, neither stretching unevenness nor thickness unevenness takes place.

A mixing ratio of the polymetaxylyleneadipamide or the like of the gas barrier resin to the amorphous polyamide to be mixed therewith is preferably in the range of 80:20 to 30:70% by weight, more preferably 80:20 to 40:60% by weight. If the ratio of the amorphous polyamide is less than 20% by weight, a sufficient improvement effect of the moldability and workability of from the sheets or the films to the containers cannot be obtained, and if it is more than 70% by weight, the problem of the moldability of the sheets or the films themselves conversely occurs and the characteristics of the polymetaxylyleneadipamide or the like are inconveniently impaired. When the amorphous polyamide is suitably blended in a ratio within the above-mentioned range, the deoxidizing multi-layer material having the good hot moldability and workability can be obtained, while maintaining the characteristics that the gas barrier properties, particularly the oxygen barrier properties of the polymetaxylyleneadipamide or the like do not deteriorate at the time of the exposure to the high-temperature and high-humidity conditions.

The thickness of the gas barrier layer comprising the gas barrier resin is not always restrictive, but when the multi-layer material is further stretched by molding to reduce its thickness, the reduction of the thickness should be taken into consideration. Thus, the thickness of the unmolded gas barrier resin layer is required to be such that the gas barrier properties are not impaired by the stretching.

The outer layer is the gas barrier layer comprising the gas barrier resin, but if necessary, a resin or a material other than the resin having another function can be laminated on one or both of the inner and outer surfaces of the gas barrier layer to further increase the function of the gas barrier layer. For example, in order to protect the layer of the gas barrier resin, a protective layer comprising another resin can be formed on the outer surface of the gas barrier layer. For the other resin layer referred to here, there can be used polyolefins such as polyethylene and polypropylene, mixtures and modified resins thereof, and polyesters such as polyethylene terephthalate. This protective layer, as needed, may suitably be blended with additives, for example, a colorant such as a pigment, a filler, an antistatic agent and a stabilizer. For the purpose of improving adhesive properties between the gas barrier layer of the outer layer and the protective layer comprising the other resin or the middle layer, an adhesive layer can be formed.

The oxygen absorbing resin composition which is the middle layer is a resin composition obtained by kneading a deoxidizer composition with the resin to disperse the same therein. No particular restriction is put on the deoxidizer composition, and known deoxidizer compositions can be used. For example, there can be used the deoxidizer compositions containing a metal powder such as iron powder, reducing inorganic substances such as iron compounds, reducing organic substances such as polyhydric phenols, polyhydric alcohols, ascorbic acid and its salts, and metal complexes as the essential components for an oxygen absorbing reaction. Above all, the deoxidizer composition containing the iron powder as the essential component is preferable in order to obtain the deoxidizing multi-layer material having the excellent deoxidizing performance, and the deoxidizer composition comprising the iron powder and a metal halide is excellent. In particular, the iron powder coated with the metal halide can suitably be used.

No particular restriction is put on the iron powder which can be used in the deoxidizer composition, and any composition can be used, so long as it can be dispersed in the thermoplastic resin and can bring about a deoxidizing reaction. The iron powder which has usually been used as a deoxidizer can be utilized. The average particle diameter of the iron powder is preferably in the range of 5 to 200 $\mu$m or less, more preferably 50 $\mu$m or less. In order to form the smooth oxygen absorbing layer, the particle diameter of the iron powder is preferably so fine as not to exceed the thickness of the layer of the oxygen absorbing resin composition.

Examples of the metal halide include chlorides, bromides and iodides of alkali metals and alkaline earth metals, and the chlorides of lithium, potassium, sodium, magnesium, calcium and barium can preferably be used. The amount of the metal halide to be blended is preferably in the range of 0.1 to 20 parts by weight, more preferably 0.1 to 5 parts by weight based on 100 parts by weight of the metal. In particular, when the metal halide is deposited on the iron powder, the amount of the metal halide to be blended can be reduced.

The water content of the deoxidizer composition is preferably low, and it is preferably 0.2% by weight or less, more preferably 0.1% by weight or less. The deoxidizer composition, however, exerts an oxygen absorbing performance by coming in contact with water, when the multi-layer material of the present invention is used as packaging material. Moreover, the deoxidizer composition containing the iron powder as the essential component can be used in the form of particles, and the average diameter of the particles is preferably in the range of 5 to 200 $\mu$m, more preferably 5 to 50 $\mu$m.

The resin with which the deoxidizer composition is blended is preferably a thermoplastic resin having a Vicat softening point of 110° to 130° C. When the thermoplastic resin having a Vicat softening point within the above-mentioned range is used, local overheating in the vicinity of the iron powder in the resin can be prevented during the hot molding of the multi-layer material, whereby the molding into the containers having a good appearance is possible. Typical examples of the thermoplastic resin include polyolefins such as polyethylene, polypropylene, propyleneethylene random copolymer, polybutadiene and polymethylpentene, elastomers and modified elastomers, and mixed resins thereof. In particular, a mixture of polyethylene and polypropylene, propylene-ethylene random copolymer, and mixed resins thereof can preferably be used.

A blend ratio of the deoxidizer composition in the oxygen absorbing resin composition is preferably in the range of 2 to 93% by weight, more preferably 10 to 70% by weight. If the above-mentioned blend ratio is less than 2% by weight, the deoxidizing performance noticeably deteriorates, and if it is more than 93% by weight, the molding and working of the deoxidizing multi-layer material into the packaging container are inconveniently poor. Furthermore, if necessary, some additives can be added to the oxygen absorbing resin composition in which the deoxidizer composition is blended, and examples of the additives include colorants such as organic and inorganic dyes and pigments, dispersants such as silane compounds and titanate compounds, a polyacrylic acid-containing water absorbent, fillers such as silica and clay, an antifoaming agent such as calcium oxide, and gas adsorbents such as zeolite and active carbon. The thickness of the oxygen absorbing layer comprising the oxygen absorbing resin composition is preferably 1000 $\mu$m or less, more preferably 500 $\mu$m or less.

As the oxygen permeating resin of the inner layer, a thermoplastic resin can preferably be used, and examples of the usable thermoplastic resin include polyolefins such as polyethylene, polypropylene, polybutadiene and polymethylpentene, modified polyolefins thereof, graft polymers of these polyolefins and silicon resins, polyesters such as polyethylene terephthalate, polyamides such as 6-nylon and 6,6-nylon, ionomers, and elastomers.

Furthermore, the oxygen permeating resin of the inner layer is preferably compatible with the oxygen absorbing layer of the middle layer, and when the mutually compatible resins are selected, the inner layer and the middle layer can be co-extruded to laminate and bond them. In addition, the resin of the inner layer often plays the role of a sealant layer as the innermost layer of the packaging container, and so a heat-sealable resin is preferably selected, but a heat-sealable layer may be formed on the inner side of the container. In this connection, if necessary, the resin of the inner layer or the heat-sealable layer can be blended with additives, for example, a colorant such as a pigment, a filler, an antistatic agent and a stabilizer.

As described above, it is necessary that the above-mentioned inner layer should play the role of an isolating layer between a matter received in the container and the oxygen absorbing layer, and should have a function for allowing oxygen to efficiently and promptly permeate through the inner layer itself. Thus, the oxygen permeability of the inner layer is required to be at least 100 cc/m$^2$.day.atm (23° C., 100% RH), irrespective of the presence of the heat-sealable layer or another layer or the thickness of the inner layer itself. Therefore, it is preferred that the thickness of the inner layer is preferably as thin as possible within a range where strength, workability, cost and the like are allowable, whereby the oxygen permeability is enhanced. As is apparent from the above-mentioned roles of the inner layer, this inner layer is not always a non-porous resin layer, and it may be a microporous film or a nonwoven fabric comprising the above-mentioned thermoplastic resin.

The above-mentioned respective layers can be laminated by suitably combining any of known methods such as a co-extrusion method, a lamination method and a coating method in compliance with properties of the materials for the respective layers, a molding purpose, a molding process and the like. For example, in the case that the deoxidizing multi-layer material is a resin laminate, resins can be molten and kneaded by extruders corresponding to the respective layers, and then co-extruded through a multi-layer multiple die such as a T-die or a circular die, thereby forming a multi-layer film or sheet. Furthermore, the molten resins can be co-injected or successively injected into an injection mold through the multi-layer multiple die to form the multi-layer packaging container having a desired shape at once.

Furthermore, the deoxidizing multi-layer material regarding the present invention is a flat or a tubular film or sheet (which may be a tube, a parison or the like) obtained by the above-mentioned procedure, but this material can be molded into the container having a desired shape by a molding method such as vacuum molding, pressure molding or plug-assist forming. In this case, a molding temperature depends upon the melting point and the softening point of the resin, but when the gas, barrier resin layer comprises the above-mentioned polyamide or the mixed resin of the polyamide copolymer and the amorphous polyamide, the molding temperature can be selected in the range of 160° to 175° C., so that the molding is possible within a relatively low temperature range. The heating for the molding of the container can be carried out by contact heating or non-contact heating, but when the contact heating is utilized, a temperature gradient generated in the deoxidizing multi-layer material can be minimized as much as possible, whereby a container appearance failure such as the stretching unevenness of each layer can be reduced.

According to the present invention, the deoxidizing multi-layer material can be used for a part or all of the sealable packaging container, so that not only oxygen slightly invaded from the outside of the container but also oxygen in the container can be absorbed to prevent the quality deterioration of a matter received in the container due to oxygen. That is to say, the film-like or the sheet-like deoxidizing multi-layer material can be molded into containers such as bags, cups, trays and bottles, and then used, or alternatively, it can be used as lids for the containers and parts of top seal films, whereby a deoxidizing performance can be imparted to the packaging containers.

Next, the present invention will be described in more detail with reference to examples, but the scope of the present invention should not be limited by these examples.

EXAMPLE 1

Iron powder (average particle diameter=35 $\mu$m, maximum particle diameter=80 $\mu$m) was placed in a vacuum mixing dryer equipped with a heating jacket, and while it was heated and dried at 130° C. under a reduced pressure of 10 mmHg, a mixed aqueous solution obtained by mixing calcium chloride and water in a ratio of 1:1 was sprayed in an amount of 3 parts by weight based on 100 parts of the iron powder to prepare a deoxidizer composition containing the iron particles on which calcium chloride was deposited.

Next, propylene-ethylene random copolymer [made by Sumitomo Chemical Co., Ltd., Sumitomo Noblen.S131, MFR=1.2 g/10 min (230° C., 2.16 kgf, ASTM D1238), Vicat softening point=119° C. (JIS K6758)] and the above-mentioned deoxidizer composition were kneaded in a mixing ratio of 3:2 (weight ratio) by a twin-screw extruder having a screw diameter of 45 mm which could rotate in one direction, and the mixture was extruded thereby, cooled on a net belt equipped with a blower, and then molded by a pelletizer to obtain the pellets comprising an oxygen absorbing resin composition.

Afterward, a 4-kind 6-layer multi-layer sheet molding machine comprising the first to fourth extruders, a feed block, a T-die, a cooling roll and a sheet winder was used. In this case, a propylene-ethylene block copolymer containing 14% by weight of titanium oxide [made by Chisso Corporation, Chisso Polypro.XF1936, MFR, 0.4 g/10 min (23° C., 2.16 kgf, ASTM D1238)] was extruded by the first extruder; the above-mentioned oxygen absorbing resin composition was extruded by the second extruder; polymetaxylyleneadipamide (made by Mitsubishi Gas Chemical Company, Inc., a polyamide containing 100 mol % of an amide structure produced by the polycondensation reaction of metaxylylenediamine with adipic acid, trade name MX Nylon 6007) was extruded by the third extruder; and a maleic anhydride-modified polypropylene was extruded by the fourth extruder, thereby obtaining a multi-layer structure sheet shown in Table 1. This multi-layer sheet was constituted of an oxygen permeating layer (an inner layer), an oxygen absorbing layer (a middle layer), an adhesive layer, a gas barrier layer (an outer layer), another adhesive layer and a protective layer (an outermost layer), and in order to conceal the oxygen absorbing layer, a propylene-ethylene block copolymer to which titanium oxide of a white pigment had been added was used for the oxygen permeating layer and the protective layer.

TABLE 1

| Main Layer | Layer Constitution | Layer Thickness ($\mu$m) |
|---|---|---|
| Inner Layer | Oxygen permeating layer: Propylene-ethylene block copolymer containing 14 wt % of titanium oxide | 100 |
| Middle Layer | Oxygen absorbing layer: (Fe/CaCl$_2$)-propylene-ethylene random copolymer | 100 |
| | Adhesive layer: Maleic anhydride-modified polypropylene | 15 |
| Outer Layer | Gas barrier layer: Nylon MXD6 | 15 |
| | Adhesive layer: Maleic anhydride-modified polypropylene | 15 |
| | Protective layer: Propylene-ethylene block copolymer containing 14 wt % of titanium oxide | 250 |

Figure 2:
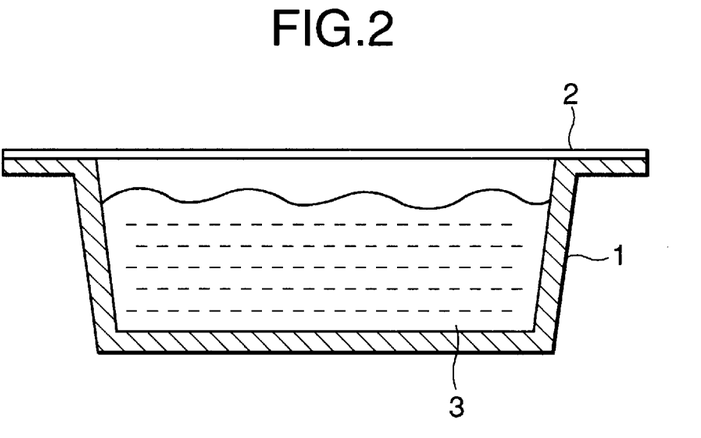
FIG. 2 is a sectional view of a packaging container prepared by molding the deoxidizing multi-layer material of the present invention.

Next, the above-mentioned multi-layer sheet was subjected to plug-assist molding at about 160° C. by the use of a vacuum molding machine to obtain a tray-like container. A pasta as food 3 was placed in the thus obtained tray-like container 1, and a gas barrier film 2 of a PET film (20 $\mu$m)-aluminum foil (20 $\mu$m)-unstretched polypropylene film (50 $\mu$m, on a heat seal side) was heat-sealed on the opening of the container to seal the tray-like container. Afterward, the sealed container in which the pasta was contained was directly subjected to a retort treatment at 121° C. for 30 minutes, and then stored at 23° C. for 30 days. During this storage term, an oxygen concentration in the sealed container was measured almost every day by the use of a gas chromatograph, and on the 30th day of the storage, the container was opened to inspect the storage state of the pasta. The results are shown in Table 2.

EXAMPLE 2

The same procedure as in Example 1 was repeated except that the gas barrier resin of the multi-layer sheet in Example 1 was replaced with a mixed resin of 70% by weight of polymetaxylyleneadipamide (made by Mitsubishi Gas Chemical Company, Inc., trade name MX Nylon 6007) and 30% by weight of 6,6-nylon (made by Ube Industries, Ltd., trade name Nylon 2026B), thereby obtaining a multi-layer sheet, and a tray-like container was then formed therefrom. For the thus obtained tray-like container, a storage test was made in the same manner as in Example 1. The results are shown in Table 2.

COMPARATIVE EXAMPLE 1

The same procedure as in Example 1 was repeated except that the gas barrier resin of the multi-layer sheet in Example 1 was replaced with an ethylene-vinyl alcohol copolymer (made by Kuraray Co., Ltd., EVAL.EPT101), thereby obtaining a multi-layer sheet, and a tray-like container was then formed therefrom. For the thus obtained tray-like container, a storage test was made in the same manner as in Example 1. The results are shown in Table 2.

TABLE 2

|  | Oxygen Conc. in Container (vol %) | | | State of Pasta |
|---|---|---|---|---|
|  | Just After Retort | 7th Day | 30th Day | 30th Day |
| Example 1 | 9.6% | 0.1% or less | 0.1% or less | Good flavor maintenance |
| Example 2 | 9.5% | 0.1% or less | 0.1% or less | Good flavor maintenance |
| Comp. Ex. 1 | 10.1% | 5.3% | 3.3% | Browning |

As is apparent from Table 2, in the case of Comparative Example 1, the oxygen concentration in the sealed container was scarcely different from that in the sealed container in Example 2 immediately after the retort treatment. However, on the 7th day, about 5% of oxygen remained, and even on the 30th day, about 3% of oxygen still remained. These results mean that oxygen in the container was not sufficiently absorbed, and therefore after the storage for 30 days, the pasta faded and its flavor was also noticeably impaired. This indicates that when the gas barrier resin was exposed to high-temperature and high-humidity conditions during the retort treatment, the oxygen gas barrier properties of the gas barrier resin deteriorated, so that the invasion of oxygen from the outside of the container could not completely be blocked and oxygen in the container could not be sufficiently absorbed.

On the contrary, in the cases of Examples 1 and 2, the oxygen concentration in the sealed container containing the pasta was controlled to 0.1% or less after the 7th day, so that the pasta did not fade and its flavor was also kept good. These effects of Examples 1 and 2 mean that the gas barrier resin layers of the present invention were excellent in resistance to the high-temperature and high-humidity conditions.

EXAMPLE 3, COMPARATIVE EXAMPLE 2

A pelletizer comprising a twin-screw extruder having two screws (diameter=50 mm) therein, a strand die, a blower cooler and a cutter was used to knead propyleneethylene random copolymer (made by Sumitomo Chemical Co., Ltd., Sumitomo Noblen.S131) with a deoxidizer composition, in a weight ratio of 60:40, which had been obtained by coating iron powder (average particle diameter=30 μm) with 1% by weight of calcium chloride, and the mixture was then pelletized to obtain the pellets of an oxygen absorbing resin composition.

Next, a 5-kind 6-layer co-extrusion multi-layer sheet molding machine was used to extrude 5 kinds of resins, i.e., the above-mentioned pellets of the oxygen absorbing resin composition (for a middle layer), a mixed resin (for an outer layer) of the same polymetaxylyleneadipamide (made by Mitsubishi Gas Chemical Company, Inc., trade name MX Nylon 6007) as in Example 1 and an amorphous polyamide [copolymer of terephthalic acid, isophthalic acid and hexamethylenediamine; made by Mitsui Du Pont Polychemical Co., Ltd.; SEALER PA3426; MFR=3.5 g/10 min (230° C., 2.16 kgf, ASTM D1238)], a resin (for a protective layer) containing a propylene-ethylene block copolymer (made by Chisso Corporation, Chisso Polypro.XF1936) and 5% by weight of titanium oxide, a resin (for an inner layer) containing the propylene-ethylene block copolymer and 14% by weight of titanium oxide, and a maleic anhydride-modified polypropylene (for an adhesive layer), thereby preparing a 5-kind 6-layer multi-layer sheet having the same constitution as in FIG. 1. The layer constitution of the multi-layer sheet is shown in Table 3.

TABLE 3

| Main Layer | Layer Constitution | Layer Thickness (μm) |
|---|---|---|
| Inner Layer | Oxygen permeating layer: Propylene-ethylene block copolymer containing 14 wt % of titanium oxide | 80 |
| Middle Layer | Oxygen absorbing layer: (Fe/CaCl$_2$)-propylene-ethylene random copolymer | 110 |
|  | Adhesive layer: Maleic anhydride-modified polypropylene | 20 |
| Outer Layer | Gas barrier layer: Nylon MXD6-amorphous polyamide | 30 |
|  | Adhesive layer: Maleic anhydride-modified polypropylene | 20 |
|  | Protective layer: Propylene-ethylene block copolymer containing 5 wt % of titanium oxide | 240 |

In the preparation of the multi-layer sheets, the ratio of the amorphous polyamide to the mixed resin of the polymetaxylyleneadipamide and the amorphous polyamide which was the gas barrier resin to be used was changed to 0, 20 and 50% to prepare 3 kinds of multi-layer sheets, and for comparison, an ethylene-vinyl alcohol copolymer (made by Kuraray Co., Ltd., Evarl.EPT101) was used as the gas barrier resin to similarly prepare a multi-layer sheet.

As a result, it was apparent that in the cases that the ratios of the amorphous polyamide were 0, 20 and 50% by weight and in the case of the ethylene-vinyl alcohol copolymer (EVOH), the preparation of the multi-layer sheets could be carried out without any particular problem.

Next, 4 kinds of multi-layer sheets having a good surface state, in which the ratios of the amorphous polyamide were 0, 20 and 50% by weight and the EVOH was used, were subjected to hot molding to prepare tray-like containers 1, 2, 3 and 4 (inside volume=350 cc, surface area=200 cm²).

In this case, plug-assist molding was carried out at heating temperatures of 160° C., 165° C. and 175° C. to obtain the respective containers. For the thus obtained containers, the appearance, particularly the occurrence state of the thickness unevenness of the gas barrier resin layers was observed to evaluate the moldability of the samples. The evaluation is represented by 3 ranks of A (excellent), B (good) and C (poor), and the results are shown in Table 4.

TABLE 4

| Example | Comp. Ex. | Container | Composition of Barrier Resin Layer | | Appearance of Molded Container | | |
|---|---|---|---|---|---|---|---|
| | | | Polymeta-xylylene-adipamide | Amorphous polyamide | Heating Temp. 160° C. | Heating Temp. 165° C. | Heating Temp. 175° C. |
| 3 | | 1 | 100 wt % | 0 wt % | A | B | C |
| 3 | | 2 | 80 wt % | 20 wt % | A | A | A |
| 3 | | 3 | 50 wt % | 50 wt % | A | A | A |
| | 2 | 4 | — | — | C | B | A |

As is apparent from Table 4, in the cases of the molded containers 2 and 3 obtained by molding the multi-layer sheets in which the ratios of the amorphous polyamide to the mixed resin of the polymetaxylyleneadipamide and the amorphous polyamide for the gas barrier resin were 20 and 50%, stretchability and deep drawing properties were good, and stretching unevenness due to the crystallization of the resin could be inhibited. Therefore, the molded articles having the good appearance could be obtained even at the respective molding temperatures, and the container moldability of the sheets was extremely good. On the contrary, in the case of the molded container 1 in which the ratio of the amorphous polyamide was 0% by weight, the container was relatively good in the vicinity of a molding temperature of 160° C., but even when the heating temperature slightly rose, the stretching unevenness and the thickness unevenness were observed and the container having the good appearance could not be obtained, which meant that an allowable molding temperature range was limited. In the case of the molded container 4 using the EVOH which was prepared for the comparison, when the heating temperature was low, the stretching unevenness and the thickness unevenness due to insufficient heating were observed and the container having the good appearance could not be obtained, but anyhow, at a molding temperature of 175° C., the container having the acceptable appearance could be obtained.

EXAMPLE 4

The tray-like container 3 (the ratio of an amorphous polyamide was 50% by weight) obtained at a molding temperature of 165° C. in Example 3 was hot-packed with 300 g of a boiled pasta, and a gas barrier film (a laminate film of a stretched polypropylene film (15 μm) coated with polyvinylidene chloride and an unstretched polypropylene film (60 μm, on a heat seal side) was used as a top film to seal the tray-like container 3. Afterward, the container 3 containing the pasta was stored at room temperature for 30 days. During this storage, the oxygen concentration in the container was measured every day. On the 30th day of the storage, a hole was made through the top film of the sealed container 3 containing the pasta, and the container was then heated for 3 minutes in a microwave oven (made by Mitsubishi Electric Corp.; model RR-50, 500 W) as it was. Afterward, the container was opened, and the state of the inner and outer surfaces of the container as well as the flavor of the pasta was inspected.

According to the results shown in Table 5, the deoxidizing performance of the container was good, and the storage state of the pasta was also good. In addition, even when heated by the microwave oven, the container was not deformed, and the surface state of the container did not change at all.

TABLE 5

| Oxygen Conc. in Container (vol %) | | | State of Container After Heating by Microwave Oven | Pasta | |
|---|---|---|---|---|---|
| 5th Day | 15th Day | 30th Day | | Appearance | Flavor |
| 0.5% | <0.1% | <0.1% | No problem | Good | Good |

EXAMPLE 5

The tray-like container 2 (the ratio of an amorphous polyamide was 20% by weight) and the tray-like container 3 (the ratio of an amorphous polyamide was 50% by weight) obtained at a molding temperature of 165° C. in Example 3 were packed with 200 g of tangle rolls and 120 g of a tangle stock, respectively (the water activity of the fillers in the containers=1.0), and an aluminum foil laminate film [a laminate film of a PET film (15 μm), an aluminum foil (20 μm) and an unstretched polypropylene film (50 μm, on a heat seal side)] was used for a top seal and the container 2 was then sealed. Afterward, the sealed container containing the tangle rolls was subjected to a heating treatment at 120° C. for 30 minutes by an air steam type high-temperature high-pressure sterilizing device, cooled, and then stored at room temperature for 30 days. During this storage, an oxygen concentration in the sealed container was measured every day, and on the 30th day of the storage, the container was opened and the appearance and the flavor of the tangle rolls were inspected to evaluate the state of quality maintenance. The results are shown in Table 6.

COMPARATIVE EXAMPLE 3

The molded tray-like container 4 (in which an EVOH was used) obtained at a molding temperature of 175° C. in Comparative Example 2 was used, and the storage test of tangle rolls was carried out in the same manner as in Example 5. The results are shown in Table 6.

TABLE 6

|  |  | Oxygen Conc. in Container (vol %) | | | Tangle Rolls | |
| --- | --- | --- | --- | --- | --- | --- |
|  |  | 5th Day | 15th Day | 30th Day | Appearance | Flavor |
| Example 5 | Container 2 | 0.5% | <0.1% | <0.1% | 3 | 3 |
| Example 5 | Container 3 | 0.5% | <0.1% | <0.1% | 3 | 3 |
| Comp. Ex. 3 | Container 4 | 0.9% | 0.7% | 0.5% | 1 | 1 |

Notes: Quality evaluation of tangle rolls
Appearance:
3 . . . Good
2 . . . Slight color change
1 . . . Noticeable color change
Flavor:
3 . . . Good
2 . . . Slight sour odor
1 . . . Noticeable sour odor As is apparent from the results in Table 6, in Example 5 in which the molded container of the multi-layer sheet of the present invention was used, even when the sealed container containing the tangle rolls and its stock was subjected to a retort treatment, oxygen could efficiently be absorbed and removed, whereby deterioration by oxidation can be prevented, with the result that the appearance, the flavor, the quality and the like of the tangle rolls were kept good. On the other hand, in Comparative Example 3 in which the molded multi-layer container using the EVOH for the gas barrier layer was employed, the deoxidizing performance of the container deteriorated, so that oxygen could not sufficiently be absorbed and removed, with the result that the flavor and the appearance of the tangle rolls could not be maintained.

As is apparent from the results of Comparative Examples 2 and 3, in the case that the EVOH is used for the gas barrier resin, a molding temperature relatively rises in molding the sheet into the container, and when the obtained container is exposed to high-temperature and high-humidity conditions in such a treatment as the retort treatment, its gas barrier properties deteriorate and the deoxidizing performance of the container also deteriorates inconveniently.

In a deoxidizing multi-layer material of the present invention, as a gas barrier resin for an outer layer, there is used a polyamide or a polyamide copolymer containing 90 mol % or more of an amide structure produced by the polycondensation reaction of metaxylylenediamine with adipic acid, whereby the oxygen barrier properties of the multi-layer material does not deteriorate, even if it is particularly exposed to high-temperature and high-humidity conditions. In consequence, it is definite that the deoxidizing multi-layer material of the present invention has the gas barrier properties which are excellent in heat resistance. In addition, when an amorphous polyamide is blended with the polyamide or the polyamide copolymer of the gas barrier resin, the deoxidizing multi-layer material can be obtained which is excellent in sheet moldability and which permits the molding and working of containers in a sufficiently wide allowable molding temperature range and in a relatively low temperature range.

The deoxidizing multi-layer material of the present invention is a multi-layer structure which is excellent in a deoxidizing function and a resin moldability such as a sheet moldability and a moldability and workability into containers and which does not deteriorate even when particularly exposed to high-temperature and high-humidity conditions.

Therefore, even when packaging containers molded from the deoxidizing multi-layer material of the present invention are subjected to a heating sterilization treatment, oxygen barrier properties do not deteriorate, so that oxygen in the containers can efficiently be absorbed, with the result that a quality maintenance effect can be exerted. In particular, the packaging containers are useful as heat-resistant deoxidizing containers to which a heating sterilization treatment such as bath sterilization, boil sterilization or retort sterilization can be applied. Therefore, the packaging containers regarding the present invention can widely be used as packaging containers for materials which require the heating sterilization treatment, for example, foods such as much water-containing foods and medicines such as infusions. Furthermore, an oxygen absorbing layer of the deoxidizing multi-layer material is also excellent in resistance to microwave, and so the packaging containers are also useful for foods which can directly be heated by the microwave oven to cook them.

What is claimed is:

1. A sheet or a film deoxidizing multi-layer material which comprises an oxygen absorbing layer as a middle layer comprising an oxygen absorbing resin composition in which a deoxidizer composition is blended, a gas barrier layer as an outer layer comprising a gas barrier resin, and an oxygen permeating layer as an inner layer comprising an oxygen permeating resin, the gas barrier resin comprising a polyamide or a polyamide copolymer which contains 90 mol % or more of an amide structure unit produced by the polycondensation reaction of metaxylylenediamine with adipic acid.

2. The deoxidizing multi-layer material according to claim 1 wherein the gas barrier resin is a mixed resin obtained by adding an amorphous polyamide to the polyamide or the polyamide copolymer.

3. The deoxidizing multi-layer material according to claim 2 wherein a mixing ratio (% by weight) of the polyamide or the polyamide copolymer to the amorphous polyamide is in the range of 80:20 to 30:70.

4. The deoxidizing multi-layer material according to claim 2 wherein the amorphous polyamide is at least one selected from the group consisting of a polycondensate of terephthalic acid and trimethylhexamethylenediamine, a copolycondensate of 2,2-bis(p-aminocyclohexyl)propane, adipic acid and azelaic acid, a copolycondensate of bis(3-methyl-4-aminocyclohexyl)methane, isophthalic acid and (ω-aminododecanoic acid, a copolycondensate of diphenylmethane diisocyanate and a mixture of adipic acid, azelaic acid and isophthalic acid, and a copolycondensate of terephthalic acid, isophthalic acid and hexamethylenediamine.

5. The deoxidizing multi-layer material according to claim 2 wherein the melt flow rate of the amorphous polyamide is 8 g/10 min or less as measured under conditions of a temperature of 230° C. and a load of 2.16 kgf in accordance with ASTM D1238.

6. The deoxidizing multi-layer material according to claim 2 wherein the glass transition point of the amorphous polyamide is in the range of 80° to 150° C.

7. The deoxidizing multi-layer material according to claim 1 wherein a protective layer comprising a gas barrier properties protecting resin is formed on an outer surface of the gas barrier layer.

8. A packaging container in which the deoxidizing multi-layer material described in claim 1 is molded as at least a part of the wall of the container and is used so that the inner layer of the material is faced inside the container.

9. A packaging container in which the deoxidizing multi-layer material described in claim 2 is molded as at least a part of the wall of the container and is used so that the inner layer of the material is faced inside the container.

10. The deoxidizing multi-layer material according to claim 5 wherein the melt flows rate is 6 g/10 min or less.

11. The deoxidizing multi-layer material according to claim 3 wherein the mixing ratio is 80:20 to 40:60.

12. The deoxidizing multi-layer material according to claim 1 which further comprises a protective layer which is laminated on one or both of an inner surface and an outer surface of the gas barrier layer, the protective layer comprising a resin selected from the group consisting of polyethylene, polypropylene and polyethylene terephthalate.

13. The deoxidizing multi-layer material according to claim 1 wherein the deoxidizer composition comprises iron powder.

14. The deoxidizing multi-layer material according to claim 13 wherein the iron powder has an average particle size of 5 to 200 $\mu$m.

15. The deoxidizing multi-layer material according to claim 14, wherein the iron powder is coated with a metal halide which is a chloride of an element selected from the group consisting of lithium, potassium, sodium, magnesium, calcium and barium.

16. The deoxidizing multi-layer material according to claim 15 wherein the metal halide is in an amount of 0.1 to 20 parts by weight of the iron powder.

17. The deoxidizing multi-layer material according to claim 1 wherein the deoxidizer composition has a water content of 0.2% by weight or less.

18. The deoxidizing multi-layer material according to claim 13 wherein the oxygen absorbing resin has a Vicat softening point of 110° to 130° C.

19. The deoxidizing multi-layer material according to claim 18 wherein the oxygen permeating resin is selected from the group consisting of polyethylene, polypropylene, propylene-ethylene random copolymer, polybutadiene, polymethylpentene and mixtures thereof; and the oxygen absorbing resin composition is in an amount of 2 to 93% by weight.

20. The deoxidizing multi-layer material according to claim 1 wherein the oxygen permeating resin is a thermoplastic resin selected from the group consisting of polyethylene, polypropylene, polybutadiene, polymethylpentene, polyethylene terephthalate, 6-nylon and 6,6-nylon; and the inner layer has an oxygen permeability of at least 100 cc/m$^2$.day.atm, measured at 23° C. and 100% RH.

* * * * *